United States Patent Office 3,679,392
Patented July 25, 1972

3,679,392
PLANT GROWTH STIMULATED BY A COMBINATION OF GLYCOLIC ACID AND GIBBERELLIN
Robert E. Strauss, Orange, and Saburo Hashimoto, Yorba Linda, Calif., assignors to Union Oil Company of California, Los Angeles, Calif.
No Drawing. Continuation-in-part of application Ser. No. 700,370, Jan. 25, 1968. This application June 18, 1969, Ser. No. 834,515
Int. Cl. A01n 9/28
U.S. Cl. 71—89      3 Claims

ABSTRACT OF THE DISCLOSURE

Glycolic acid applied to foliage will open stomata pores and cause the plant to become desiccated. The glycolic acid also may be combined with known desiccants. In lower concentrations, the glycolic acid may be employed with systemics such as herbicides and gibberellic acid to aid their absorption and translocation by the plant.

DESCRIPTION OF THE INVENTION

This application is a continuation-in-part of Ser. No. 700,370 filed Jan. 25, 1968, now abandoned. This invention relates to agronomical uses of glycolic acid and comprises the treatment of foliage of plants with an aqueous solution of glycolic acid to open the stomata of a plant and, more particularly, to the use of glycolic acid, alone, or combined with desiccating materials for dehydrating the plant, or combined with systemic plant growth regulators.

The respiration and transpiration of most plants take place through pores called stomata which open and close in response to requirements of the plant. In most plants the stomata are present chiefly in the leaf, and in that location function to control the uptake and loss of water and also carbon dioxide and oxygen exchange.

A thorough treatment of the subject is to be found in the publication "Stomata and Water Relations in Plants," published in 1963 by the Connecticut Agricultural Experimental Station, New Haven, as Bulletin 664, and edited by Israel Zelitch.

In order that they may be effiectively harvested, many agricultural crops such as cotton, potatoes, peppers, tomatoes, seed clover, grain, sorghum, etc., must be first desiccated. The crop when it reaches harvesting maturity is sprayed with a suitable desiccant and in a few days the foliage dries completely and the plant is killed; this permits harvesting without interference from the leaves and stalks of a live healthy plant.

Spraying a mature crop with a desiccant does not always produce thorough and uniform results. The lack of uniformity is caused by factors such as the type of plant and its water content, humidity, temperature, the time of day the plant is sprayed, soil conditions, etc. Variations, due to wind, also may prevent a thorough application of a desiccant to a plant. Accordingly, in order to ensure thorough desiccation, a crop may have to be repeatedly sprayed or else a higher concentration of desiccant must be used. In either event, producing thorough and uniform desiccation of crops involves both time and expense.

Frequently, when applying systemic plant growth regulants to foliage, i.e., agents which depend on absorption into the plant tissue and translocation or distribution through the plant by the plant's internal mechanism, difficulty is often experienced in penetrating the outer protective layers of the foliage with the agent. An example of such an agent is the growth stimulant gibberellic acid, which is absorbed only with difficulty by plants. Consequently the action of the growth stimulant is confined locally to the area of application rather than affecting the plant as a whole.

A somewhat similar situation is to be found when spraying the foliage of plants with systemic toxicants, e.g., herbicides, fungicides or insecticides.

It is, therefore, an object of this invention to provide a substance which will open the pores of the stomata in plants.

Another object is to provide a substance which will desiccate plants by opening their stomata and permit the plant's fluids to drain from its foliage.

Another object is to provide glycolic acid either alone or in combination with a desiccant, for application to the stomata of a plant thereby causing the plant to be desiccated.

Another object is to provide glycolic acid in combination with systemic plant growth regulants for application to the stomata of a plant to improve the effect of the systemic agents on the plant.

Another object is to provide glycolic acid in combination with plant growth regulators in an amount effective to improve the effectiveness of these regulators.

Another object is to provide glycolic acid in combination with a herbicide for the purposes of improving its phytotoxicity.

Other objects of the invention will become apparent from the description to follow.

According to the invention, the opening of stomata of plant foliage can be stimulated by application of glycolic acid to the foliage. When the stomata have opened in response to the application of a sufficient dosage of glycolic acid, water will drain from the plant, through the stomata pores, causing the plant to become desiccated. An aqueous solution of glycolic acid may be used alone or admixed with other known desiccants. Also, the desiccants can be applied prior to, or following application of, the glycolic acid. When used alone, a dosage of about 5–25 gallons of an aqueous solution containing about 5–70% by weight preferably 15–60%; and, most preferably 25–50% by weight of glycolic acid can be applied per crop acre. This variation in dosage will accommodate most plants in terms of crop density, foliage area, moisture content, etc. When used in combination with other desiccants, the concentration of glycolic acid can be about 2–50% by weight, preferably 5–35% by weight of the entire composition applied to the foliage.

Many desiccants may be suitably combined with glycolic acid to enhance its desiccant effect, and the following are useful ammonium nitrate formulations which exhibit a non-systemic desiccating action.

| | Solution | | | |
|---|---|---|---|---|
| | A, wt. percent | B, wt. percent | C, wt. percent | D, wt. percent |
| Ammonium: | | | | |
| Nitrate | 39.5 | 44.6 | 36.6 | 56.0 |
| Chloride | 11.5 | | 11.0 | |
| Thiosulfate | | 11.0 | 9.0 | |
| Orthophosphate | 0.0–0.5 | 0.0–0.5 | 0.0–0.5 | 0.0–0.5 |
| Emulsifier | 1.0 | 1.0 | 1.0 | 1.0 |
| Water | 47.0–48.0 | 42.9–43.4 | 41.9–42.4 | 42.5–43.0 |

Other desiccants and/or defoliants that can be used in combination with glycolic acid include inorganic materials such as arsenic acid, calcium cyanamide, magnesium or sodium chlorates, etc. Organic agents which can be used in combination with glycolic acid to prepare an improved desiccant or defoliant comprise the $C_1$–$C_6$ alkyl phosphorotrithioites and phosphorotrithioates. Typical of such materials are trimethyl phosphorotrithioate,
triethyl phosphorotrithioate, tri-n-propyl phosphorotritioate,
tri-n-butyl phosphorotrithioate (DEF),
tri-sec-butyl phosphorotrithioate,
triamly phosphorotrithioate, etc.

Typical of the trithioites are trimethyl phosphorotrithioite,
tripropyl phosphorotrithioite,
tributyl phosphorotrithioite (Merphos),
trihexyl phosphorotrithioite, etc.

The halide salts of N,N–$C_1$ to $C_6$ alkyl and alkylene substituted dipyridines can also be combined with glycolic acid to provide improved desiccants and defoliants. Examples of these are:

1,1′-dimethyl-4,4′-dipyridylium chloride (Paraquat),
1,1′-diisopropyl-4,4′-dipyridylium bromide,
1,1′-dihexyl-4,4′-dipyridylium chloride,
1,1′-dimethyl-2,2′-dipyridylium bromide,
1,1′-ethylene-2,2′-dipyridylium bromide (Diquat),
1,1′-diamyl-2,2′-dipyridylium chloride,
1,1′-tetramethylene-2,2′-dipyridylium bromide, etc.

Examples of compositions useful as improved desiccants or defoliants according to our invention are set forth in the following table:

| Solution | Ingredient | Weight percent |
|---|---|---|
| E | Arsenic acid | 3 |
|   | Glycolic acid | 30 |
|   | Water | 67 |
| F | Magnesium chlorate | 5 |
|   | Glycolic acid | 15 |
|   | Water | 80 |
| G | Tri-n-butyl phosphorotrithioate (DEF) | 1.5 |
|   | Glycolic acid | 10.0 |
|   | Water | 88.5 |
| H | Triethyl phosphorotrithioite | 2.0 |
|   | Glycolic acid | 40.0 |
|   | Water | 58.0 |
| I | Ammonium nitrate | 47 |
|   | Glycolic acid | 20 |
|   | Water | 32 |
|   | Emulsifier, Triton X-207 | 1 |
| J | Ammonium nitrate | 35 |
|   | Glycolic acid | 30 |
|   | Water | 34 |
|   | Emulsifier, Emcol H2A | 1 |
| K | 1,1′-ethylene-2,2′-dipyridylium bromide (Diquat) | 2.5 |
|   | Glycolic acid | 25 |
|   | Water | 72.5 |
| L | 1,1′-dimethyl-4,4′-dipyridylium chloride (Paraquat) | 3 |
|   | Glycolic acid | 10 |
|   | Water | 87 |

The effectiveness of glycolic acid in desiccating young cotton plants about 7 inches in height was determined using varying concentrations of glycolic acid and water which were sprayed onto the plants' foliage. A comparsion is also made with a 50–50 mixture of Solution B and glycolic acid. The results are tabulated below in Table 1.

TABLE 1

| | Concentration (70% solution), weight percent | Total volume plant, milliliters | Effectiveness [1] | |
|---|---|---|---|---|
| | | | 1 hour | 24 hours |
| Test: | | | | |
| 1 | 50 | 10 | 6B | 9B |
| 2 | 25 | 10 | 6B | 8B |
| 3 | 10 | 10 | 4 | 6B |
| 4 | 5 | 10 | 2 | 2 |
| 5 | 1 | 10 | 1 | 1 |
| 6 | 100 | 5 | 2 | 9B |
| 7 | (2) | 10 | 1 | 9 |

[1] Effectiveness rating: 1=no effect; 10=complete desiccation and/or defoliation.
[2] 50% glycolic acid, 50% Solution B.
NOTE.—B=brown leaf color.

The effectiveness of glycolic acid, Solution B and AMSCO HJ–E–1, a high aromatic content solvent, were compared using cotton seedlings 20 inches high. All the compositions tested, except in Trial No. 2, contained about 1 percent of an emulsifier, Emcol H2A to facilitate wetting of the foliage by the compositions. The data on desiccation/or defoliation are recorded in Table 2 below.

TABLE 2

| Trial No. | Glycolic (70% soln.) acid [a] | $H_2O$ [a] | Solution B [a] | AMSCO HJ–E–1 [a] | Effectiveness [b] | |
|---|---|---|---|---|---|---|
| | | | | | 1 hour | 24 hours |
| 1 | 5 | 0 | 0 | 0 | 3 | 8 |
| 2 | 0 | 0 | 5 | 0 | 2 | 8 |
| 3 | 3 | 2 | 0 | 0 | 2 | 5 |
| 4 | 3 | 0 | 2 | 0 | 2 | 6 |
| 5 | 3 | 0 | 0 | 2 | 4 | 9 |
| 6 | 0 | 0 | 3 | 2 | 3 | 7 |
| 7 | 1 | 4 | 0 | 0 | 2 | 3 |
| 8 | 1 | 0 | 4 | 0 | 2 | 6 |
| 9 | 1 | 0 | 0 | 4 | 6 | 9 |

[a] Parts by volume.
[b] Effectiveness rating 1=no effect; 10=complete desiccation and/or defoliation.

It will be apparent that the glycolic acid is an effective desiccant, exhibiting about the same activity as Solution B. Glycolic acid also has numerous properties which favor its use as opposed to prior art desiccants, since it is water soluble and does not have to be formuated for blending purposes. Glycolic acid is also compatible with the aforementioned desiccants and defoliants and can readily be admixed with aqueous solutions or emulsions of these to serve as an adjuvant.

While the use of glycolic acid has been discussed in terms of its desiccating action on a plant, it can also be used along with nutrients and with other plant growth regulants such as gibberellic acid and the alkali metal salts thereof which are used to stimulate growth. Because gibberellic acid is chelated by the soil, it must be applied to the leaves and stalks of a plant in an aqueous solution or in a dusting powder rather than to the roots in order to stimulate plant growth. Gibberellic acid is absorbed with difficulty through the plant's foliage and in many instances, an application is either ineffective or repeated doses are required. However, when glycolic acid is employed along with gibberellic acid, the plant stomata are opened in sufficient amount to permit entry of the gibberellic acid into the plant system.

The amount of glycolic acid employed with gibberellic acid or its alkali metal salts is less than that required for desiccation purposes. The proper amount of glycolic acid is determined by such factors as the moisture content, size, type and age of the plant, soil type, moisture conditions, sunlight conditions, season, temperature, etc.

Typically, the glycolic acid is used in concentrations from about 0.05 to 3.5 weight percent; preferably from about 0.15 to about 2.0 weight percent; and, most preferably, from about 0.2 to 1.5 weight percent.

The gibberellin is used at concentrations from about 1 to about 250 parts per million. Preferably, the concentration is from 5 to 150 and, most preferably, from 10 to 100 parts per million. It has been found that the presence of the glycolic acid increases the effectiveness of the gibberellin, particularly at low concentrations (1–25 parts per million) or, particularly when used on waxy leafed plants. This increase in effectiveness is believed to be the result of the glycolic acid functioning to open the leaf stomata and thereby permitting ready adsorption of the gibberellin into the leaf tissue.

The mixture of glycolic acid and gibberellin can be furnished as a concentrate suitable for dilution prior to use with from 1 to about 200 volumes water per volume of concentrate. Useful concentrates contain from 10 to 80 weight percent glycolic acid and from 0.1 to 5 weight percent gibberellic acid or alkali metal or ammonium salts thereof. Useful concentrates include the following:

Concentrate 1: Wt. percent
   Glycolic acid _____ 50.0
   Gibberellic acid _____ 1.0
Concentrate 2:
   Glycolic acid _____ 25.0
   Sodium gibberillate _____ 1.5
Concentrate 3:
   Glycolic acid _____ 75
   Gibberellic acid _____ 2.0

The glycolic acid is applied in sufficient dosage to effect opening of the stomata. This application is from 0.1 to about 10, preferably from 0.2 to about 7, and most preferably, from 0.5 to 5 pounds per acre. The glycolic acid can be applied in an aqueous solution with sufficient volume to insure adequate wetting of the foliage without excessive runoff. This volume of spray is generally from 10 to 50 gallons per acre for most field crops such as cotton and grapes. Higher dosages are, of course, necessary for orchard sprays, e.g., from 25 to 400 gallons per acre can be used for treatment of citrus or deciduous trees.

The following illustrates compositions of glycolic acid and gibberellic acid for plant growth and/or fruit stimulation:

| Composition | Glycolic acid, percent | Gibberellic acid, p.p.m. | Crop | Dosage gal./acre | Remarks |
| --- | --- | --- | --- | --- | --- |
| M | 3.2 | [1] 52 | Cotton | 15 | Applied during blooming. |
| N | 2.0 | 130 | Grapes | 30 | Do. |
| O | 0.5 | [2] 29 | Cherries | 275 | Applied 10-14 days after blooming. |
| P | 1.0 | 10 | Lemons | 125 | Applied in Oct.-Dec. before fruit yellowing. |

[1] Sodium salt.
[2] Potassium salt.

The effectiveness of glycolic acid in aiding the adsorptivity and, hence, effectiveness of glycolic acid on a waxy leafed plant was determined by testing on English ivy (*Hedra helix*). The ivy plants had a prominent runner from about 2 to 5 inches in length and were in individual pots. Prior to treatment, the plants were fertilized with one ounce of an aqueous, 5 weight percent, urea solution. Each treatment was applied to four replicates and comprised three burst of spray of the solution under investigation from a finger pump sprayer, the amount of spray thus applied being adequate to wet the leaf tissue to runoff.

The following treatments were applied with the indicated growth response:

| Treatment | | Average percent elongation at— | |
| --- | --- | --- | --- |
| Gibberellic acid, p.p.m. | Glycolic acid, weight percent | 2½ weeks | 5 weeks |
| 5 | 0 | 17.3 | 39.5 |
| 5 | 0.5 | 17.1 | 65.0 |
| 5 | 2.5 | [1] 42.0 | 97.5 |
| 20 | 0 | 26.3 | 106.0 |
| 20 | 0.5 | 45.0 | 69.0 |
| 20 | 2.5 | [1] 7.8 | 20.5 |
| 50 | 0 | 39.0 | 130.0 |
| 50 | 0.5 | 64.0 | 169.0 |
| 50 | 2.5 | [3] 39.5 | 67.0 |
| 0 | 0 | 14.2 | |
| 0 | 0.5 | 6.7 | 8.3 |
| 0 | 2.5 | [4] 0 | 0 |

[1] Leaf damage, one replicate.
[2] Leaf damage, all replicates.
[3] Leaf damage, three replicates.
[4] Leaf damage, two replicates.

The leaf damage observed on plants treated with the solutions containing 2.5 weight percent glycolic acid indicated that this concentration was at the incipient level for disiccation on the young ivy plants. Applications on ivy plants are, therefore, preferably made at lower concentrations of glycolic acid, within the preferred or most preferred ranges previously disclosed.

Similar treatments were applied to a second set of the ivy plants. The treatments that were applied and the results obtained are set forth in the following table.

| Treatment | | Avg. elongation at 3 wks | |
| --- | --- | --- | --- |
| Gibberellic acid, p.p.m. | Glycolic acid, weight percent | Number of replicates | Inches | Percent |
| 0 | 0 | 11 | 1.59 | 27 |
| 12.5 | 0 | 7 | 1.65 | 23 |
| 12.5 | 0.375 | 8 | 2.51 | 34 |

These experiments evidence that glycolic acid significantly promotes the effectiveness of the gibberellic acid although, when used alone, glycolic acid is not a growth promoter.

The glycolic acid can also be used with other plant growth regulants such as the systemic general and selective herbicides. Included in these are chlorophenoxyalkanoic acids, esters and salts thereof such as 2,4-dichlorophenoxyacetic acid,
2,4,5-trichlorophenoxyacetic acid,
2-methyl-4-chlorophenoxyacetic acid,
2-methyl-(4-chlorophenoxy)butyric acid,
4-(2,4-dichlorophenoxy)butyric acid,
2-(2,4,5-trichlorophenoxy)propionic acid, the alkali metal salts of the aforementioned acids or esters of these acids with $C_1$–$C_8$ alkanols or $C_1$–$C_3$ glycols or glycol mono-ethers with $C_1$–$C_5$ alkoxy groups. Examples of these are sodium 2,4-dichlorophenoxyacetate,
potassium-2-(2,4,5-trichlorophenoxy)propionate,
octyl-2,4-dichlorophenoxyacetate,
monobutoxyethylene glycol-2,4-dichlorophenoxyacetate, etc.

Other herbicides include $C_1$–$C_5$ alkyl-N-phenyl carbamates and alkyl thiolcarbamates such as isopropyl-N-phenyl-carbamate,
ethyl-N-chlorophenylcarbamate,
4-chloro-2-butynyl-N-(3-chlorophenyl)-carbamate,
2,3-dichloroalkyl-N,N-diisopropylthiolcarbamate,
ethyl-N,N-di-n-propylthiolcarbamate,
methyl-N-(3,4-dichlorophenyl)-carbamate,
n-propyl-N-ethyl-N-(n-butyl)thiolcarbamate,
2-chloroallyl-N,N-diethyldithiocarbamate, etc.

Urea derivatives that exhibit phytotoxicity can also be used and examples include N,N' substituted ureas having the following substituents: phenyl, chlorophenyl, $C_1$–$C_5$ alkyl, alkoxy and chloroalkyl or chloronorbornyl. Examples include:

1,3-bis-(2,2,2-trichloro-1-hydroxyethyl) urea,
3-(3,4-dichlorophenyl)-1,1-dimethylurea,
3-phenyl-1,1-dimethylurea,
1-(chloro-2-norbornyl)-3,3-dimethylurea,
3-(3,4-dichlorophenyl) 1-methoxy-1-methylurea,
3-(4-chlorophenyl)-1,1-dimethylurea,
3-(3,4-dichlorophenyl)-1-n-butyl-1-methylurea, etc.

Amides which demonstrate phytotoxicity can also be combined with the glycolic acid and these amides include the $C_1$–$C_6$ alkyl, chloroalkyl, phenylalkyl, naphthylalkyl, and alkenyl amides having N-phenyl, N-alkyl, N-chlorophenyl and N-alkenyl substituents. Examples include: N-(3,4-dichlorophenyl)-methacrylamide, N-N-dimethyl-2,2-diphenylacetamide, 1-naphthylacetamide, N-(3-chloro-4-methylphenyl) - 2 - methylpentanamide, N-(3,4-dichlorophenyl)propionamide, etc.

Dichlorobenzoic acid and its amino, $C_1$–$C_3$ alkoxy, nitro and halo derivatives can also be combined with glycolic acid to provide an improved herbicide. Examples of this class include dichlorobenzoic acid, 2,3,6-trichlorobenzoic acid, 3-amino-2,5-dichlorobenzoic acid, 2,6-dichlorobenzonitrile, 2-methoxy-3,6-dichlorobenzoic acid, etc.

Various nitrated phenyl compounds known to have phytotoxicity can be combined with glycolic acid such as 4,6-dinitro-o-sec-butyl phenol and its alkali metal or alkanol amine salts, 4,6-dinitro-o-cresol, N,N-di(n-propyl)-2,6-dinitro-4-methylaniline, etc.

The glycolic acid can be admixed with any of the aforementioned herbicides in proportions such that the final aqueous spray used in the application will provide from 1 to 30 pounds per acre of glycolic acid. A preferred dosage is from 5 to about 20 pounds per acre. The concentrations of glycolic acid in the final spray can be from 2 to 25 weight percent, preferably from 5 to 15 weight percent, and the herbicide can be present in an amount from 0.1 to about 10 weight percent in the spray.

Examples of suitable spray compositions are:

| Composition | Glycolic acid, percent | Herbicide | Typical application |
|---|---|---|---|
| Q | 5 | 2,4-dichlorophenoxy acetic acid, 2%. | Broad leaf weed control. |
| R | 10 | Isopropyl N-phenyl carbamate, 5%. | Pre-emergence herbicide. |
| S | 12 | 3-phenyl-1,1-dimethyl urea, 3%. | Control of woody plants. |
| T | 8 | 1-naphthylacetamide | Thinning of apples. |
| U | 2 | 2,3,6-trichlorobenzoic acid. | Pre-emergence herbicide. |
| V | 3 | 4,6-dinitro-o-sec-butyl phenol. | General purpose herbicide. |

Accordingly, it will be seen that the use of glycolic acid to open the stomata of a plant will permit the entry of various systemic substances into the plant, and thus enhance their acitvity. Furthermore, when used in excessive quantities, the glycolic acid will cause the plant to be desiccated thus assisting in plant harvesting.

We claim:
1. An aqueous concentrate suitable for dilutions to form a plant growth stimulant foliar spray comprising form 10 to 80 weight percent glycolic acid and from 0.1 to 5 weight percent gibberellic acid or the ammonium or alkali metal salts thereof.

2. An aqueous solution useful as a plant growth promoting foliar spray which comprises from about 1 to 250 parts per million gibberellic acid, the ammonium or alkali metal salts thereof and from 0.05 to 3.5 weight percent glycolic acid.

3. The method of stimulating the growth of stomata-containing-plants which comprises applying to the foliage of said plants an aqueous solution comprising water, glycolic acid at a concentration of about 0.05 to 3.5 weight percent and below the incipient level for desiccation and gibberellic acid or ammonium or alkali metal salt thereof at a concentration of between about 1 and 250 parts per million in an amount effective to enhance the growth response of said plant.

References Cited

UNITED STATES PATENTS 2,842,051    7/1958    Brian et al. _____ 71—89

FOREIGN PATENTS 10,831    1/1963    Japan _____ 71—89

OTHER REFERENCES

Terent'ev et al., "Effect of Low Mole Wt. etc." (1965), CA66 No. 54601c (1967).

Zelitch: "Biochem. Control of Stomatal Opening etc." (1965), Fed. Proc. 24, pp. 868–72 (1965).

Zelitch: "Stomata & $H_2O$ Relations in Plants" (1963), Conn. Ag. Exp. Sta. Bull. 664, pp. 1 and 30–36 (1963).

LEWIS GOTTS, Primary Examiner

G. HOLLRAH, Assistant Examiner

U.S. Cl. X.R.

71—70, 71, 79, 84, 94, 100, 101, 108, 109, 110, 111, 113